United States Patent [19]

Faley et al.

[11] 4,069,910
[45] Jan. 24, 1978

[54] APPARATUS AND METHOD FOR CENTER POSITIONING LUMBER AND THE LIKE

[76] Inventors: Arnold F. Faley, 510 W. Mill Plain Blvd., Suite 2-C, Vancouver, Wash. 98661; Frederick J. Davis, 1903 E. 9th St., Vancouver, Wash. 98660

[21] Appl. No.: 679,387

[22] Filed: Apr. 22, 1976

[51] Int. Cl.$^2$ .................................... B65G 47/30
[52] U.S. Cl. .................................... 198/456; 198/502; 209/74 R; 271/227; 271/239
[58] Field of Search .............. 198/29, 30, 31 AA, 32, 198/39, 20 R, 456, 502; 271/227, 228, 239, 240, 254; 144/246 F, 253 C; 209/74 R

[56] References Cited

U.S. PATENT DOCUMENTS

| | | | |
|---|---|---|---|
| 2,863,551 | 12/1958 | Bilocq | 198/29 |
| 2,868,249 | 1/1959 | Taylor et al. | 198/20 R |
| 3,022,998 | 2/1962 | Patalon | 271/240 |
| 3,244,418 | 4/1966 | Henderson | 271/227 |
| 3,310,080 | 3/1967 | Delcellier | 198/29 X |
| 3,451,522 | 6/1969 | Ahlstedt | 198/29 |
| 3,511,356 | 5/1970 | Bilocq | 198/29 |
| 3,710,923 | 1/1973 | Fromme et al. | 198/31 AA |
| 3,720,300 | 3/1973 | Rysti | 198/20 R |
| 3,858,631 | 1/1975 | Andersson et al. | 198/29 X |

FOREIGN PATENT DOCUMENTS

| | | | |
|---|---|---|---|
| 30,372 | 11/1959 | Finland | 198/29 |
| 40,700 | 12/1968 | Finland | 198/29 |
| 309,201 | 3/1969 | Sweden | 198/29 |

*Primary Examiner*—Evon C. Blunk
*Assistant Examiner*—Richard K. Thomson
*Attorney, Agent, or Firm*—Chernoff & Vilhauer

[57] ABSTRACT

Method for positioning lumber being transported on a conveyor prior to sorting or other similar processing, comprises centering the lumber intermediate its ends on the conveyor, reducing the number of conveyor lines required. The apparatus includes a first displacement member, for laterally even ending the lumber in a first direction, and a sensing member, for sensing the length of the lumber relative to the plane of the even ending. The lumber then is displaced laterally in a second, 180° opposed, direction by a second displacement member until lumber engagement members, upon signal of the sensing member, selectively stop each piece of lumber at a particular transverse position on the conveyor corresponding to the length of that piece of lumber. The lumber engagement members comprise continuous chains interposing the lines of the conveyor and having segmented stops pivotally mounted thereon. The stops are movable between vertical positions for intercepting the lumber, preventing its further lateral displacement, and horizontal positions allowing passage of the lumber. An air cylinder located on each lumber engagement member operates in conjunction with a contoured snout mounted adjacent to one end of the chain for positioning selected stops in their vertical positions before passage by the lumber; and a knockdown pad mounted adjacent to the opposite end of the chain knocks the stops to their horizontal positions after passage by the lumber.

8 Claims, 8 Drawing Figures

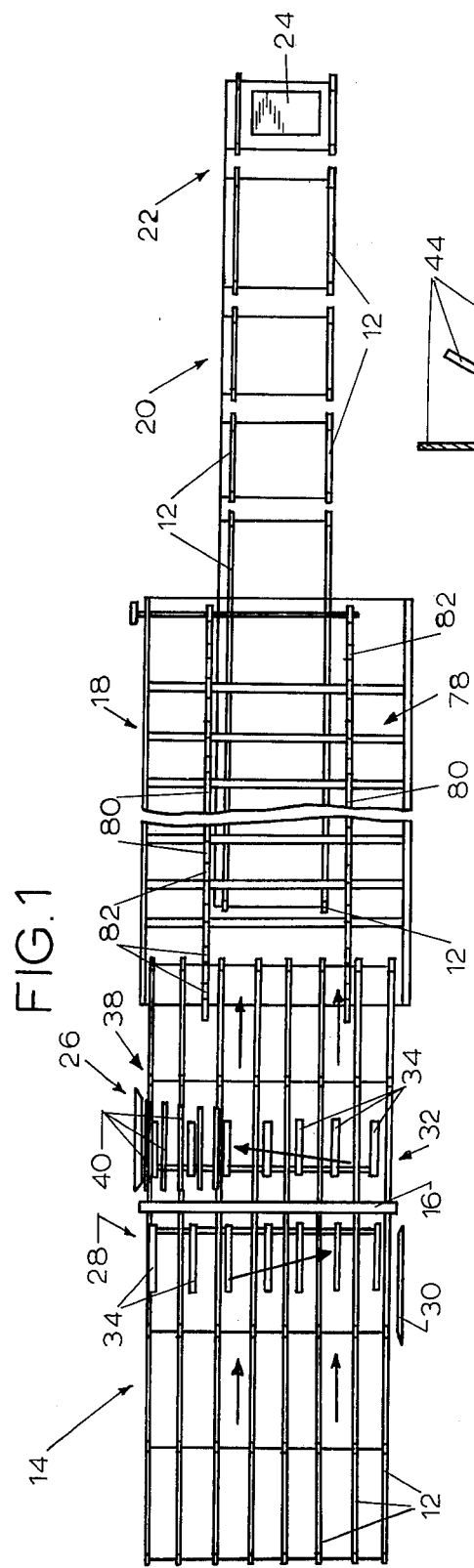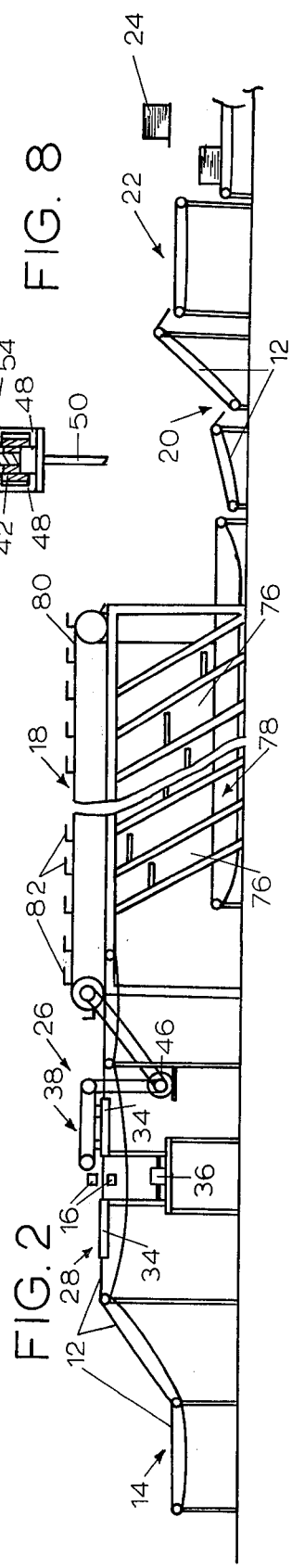

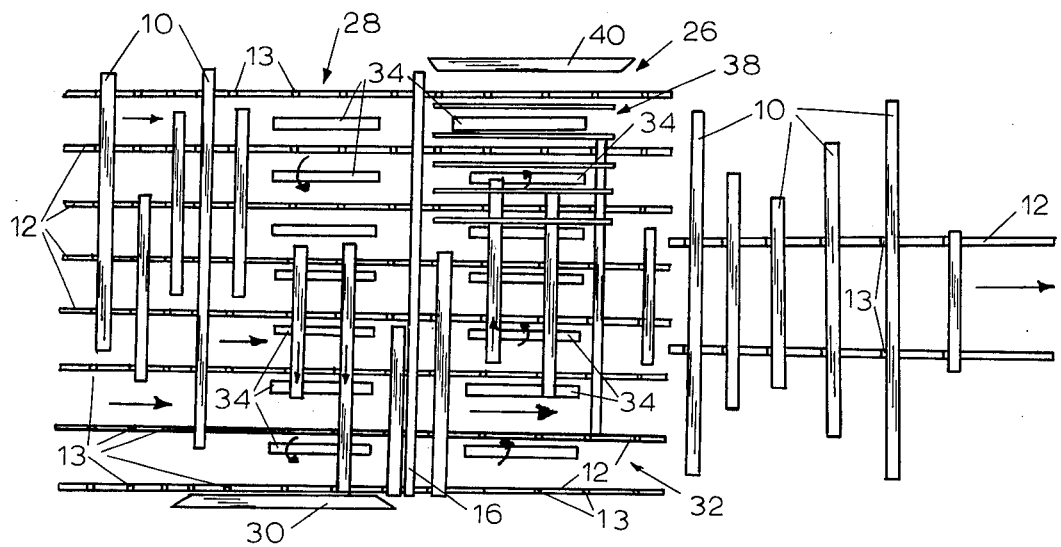

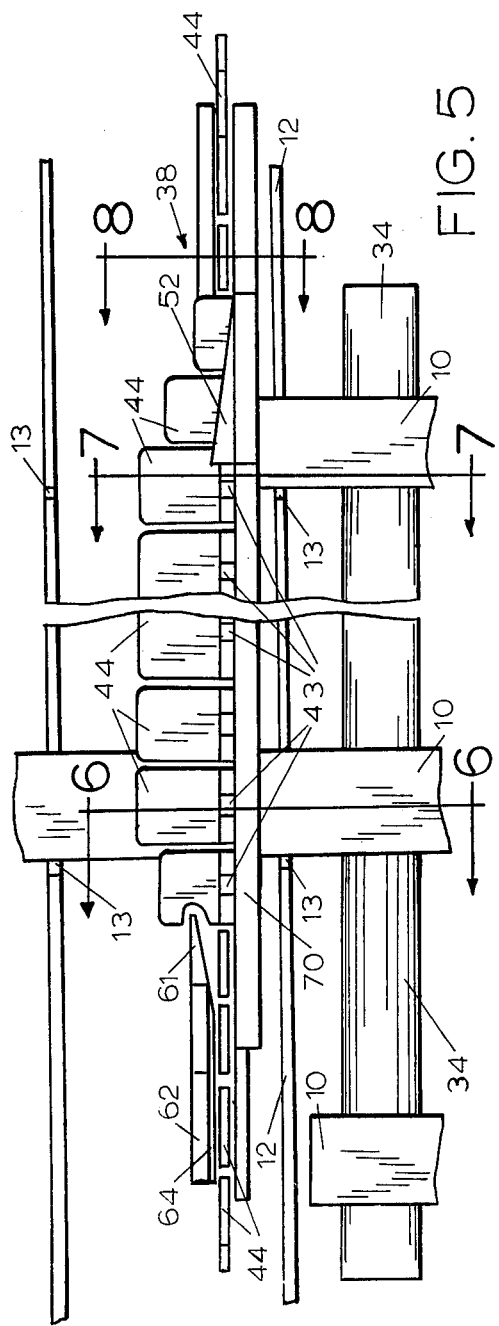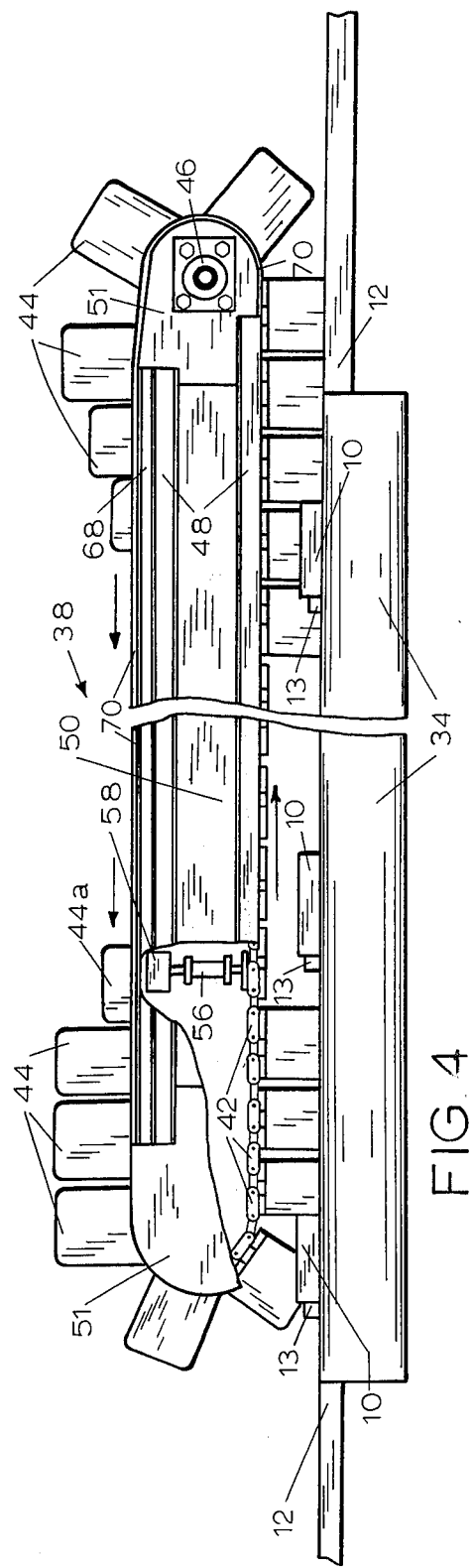

APPARATUS AND METHOD FOR CENTER POSITIONING LUMBER AND THE LIKE

BACKGROUND OF THE INVENTION

This invention relates to the handling of lumber on a conveyer, and more particularly to a method and apparatus for center positioning the lumber intermediate its end on the conveyor.

After lumber has been sawed to its desired size, it must be transported, sorted for length, width, grade, lot, etc., and stacked for drying. Conveyors comprising a plurality of endless chains in parallel lines are used for this purpose. Since these lines must transport the lumber through the entire process, they are long, sometimes extending up to 300 feet or more in over-all length.

The number of side by side conveyor lines required depends upon the lengths of the lumber being transported. In the prior art handling systems the lumber is disposed randomly laterally on these conveyor lines, requiring additional lines for supporting the lumber. For example, a system handling lumber ranging from 8 feet to 24 feet in length requires a minimum of 5 such lines to carry the lumber. Due to this requirement of multiple lines the initial cost and maintenance of the prior art lumber handling systems are high.

In addition when the lumber is disposed randomly on the lines of the prior art handling systems, it will be deposited onto the handling equipment, such as a sorter, in a disorderly manner. As a result, the lumber is unstable and may cause asymmetrical loading of the sorter. This particularly is a problem in cart sorters having spring loaded positionable floors, as the floors may be displaced unevenly and jam. In addition with a bin type sorter a single load cable may be utilized in place of the common double cable arrangement, lowering the initial cost of the sorter.

SUMMARY OF THE INVETION

The present invention basically comprises positioning random length pieces of lumber that are being transported transversely on a conveyor, substantially intermediate their ends relative to the conveyor, reducing the number of conveyor lines required for further handling of the lumber.

It is by virtue of the foregoing basic concept that the principal objective of this invention is achieved; namely to overcome the aforementioned disadvantages of lumber handling systems of the prior art.

Another object of this invention is to provide an apparatus for center positioning the lumber on the conveyor while it is being transported.

A further object of this invention is to provide such an apparatus which utilizes positioning elements moving at the same speed as the lumber being transported so that a high line speed is possible without loss of accuracy or dependability in sorting.

A further object of this invention is to provide such an apparatus which also can position selected pieces of lumber on the conveyor in any desired transverse position.

The foregoing and other objects and advantages of the present invention will appear from the following detailed description, taken in conjunction with the accompanying drawings of the preferred embodiment.

BRIEF DESCRIPTION OF THE DRAWINGS

FIG. 1 is a fragmentary, foreshortened, partially diagrammatic plan view of a lumber handling system embodying the positioning apparatus of the present invention.

FIG. 2 is a fragmentary, foreshortened, partially diagrammatic elevational view looking from the side of the view of FIG. 1.

FIG. 3 is a fragmentary, partially diagrammatic plan view of the apparatus of the invention.

FIG. 4 is a foreshortened, fragmentary elevational view, partially broken away, showing the lumber engagement means which is a member of the apparatus of the present invention.

FIG. 5 is a foreshortened, fragmentary plan view looking from the top of the view of FIG. 4.

FIG. 6 is a sectional view taken on the line 6—6 of FIG. 5.

FIG. 7 is a sectional view taken on the line 7—7 of FIG. 5.

FIG. 8 is a sectional view taken on the line 8—8 of FIG. 5.

DETAILED DESCRIPTION OF A PREFERRED EMBODIMENT

Referring to FIGS. 1 and 2, dimensioned lumber 10 is shown as it typically is handled by mechanical means through the stages of processing after it has been sawn. The lumber is carried transversely on conveyors formed of a plurality of endless chains placed side by side in parallel lines 12. Lugs 13, located on the chains at spaced intervals, engage the pieces of lumber separating them by a predetermined distance as they are transported along with the lines. The number of these lines that are required depends primarily on the length of the lumber being handled.

In the embodiment illustrated the system through which the lumber is handled includes an infeed section 14; sensing means 16, where the lumber is graded for length and other pertinent parameters; a sorter 18, for sorting the graded lumber into separate compartments; an unscrambler 20, for separating the accumulated lumber emptied from a filled sorter compartment; and a stacker 22, for stacking the graded lumber. In the case of green lumber a sticker placer 24 is included for placing stickers between the pieces of lumber for drying.

The present invention provides means for center positioning the lumber prior to sorting, thus reducing substantially the number of lines required for handling of the lumber when there is a wide variation in the length of the pieces. To this end a positioning apparatus 26 is included in the handling section.

As best illustrated in FIG. 3, the positioning apparatus includes first displacement means 28, located between the conveyor lines in the infeed section, which engages the lumber being carried on the lines, displacing it laterally in a first direction simultaneously with its movement by the lines. The lumber is displaced to a given position, defined, for example, by a mechanical stop 30 located outside the outermost line on the first side of the apparatus.

The first displacement means is located upstream of the sensing means 16 a sufficient distance to bring all of the pieces of lumber into contact with stop 30 before they pass the sensing means. Therefore each piece of lumber is even ended when it passes through the sensing means so that the sensing means can sense the length of each piece relative to the stop by measuring only one end.

Sensing means of this type are well known in the prior art and may include a series of spaced limit switches, photocells, or other means to measure length, height, width, and quality of the lumber. Included with the sensing means is annunciation means (not shown) for signaling later elements of the system for acting upon the sensed parameters. The annunciation means may be as simple as a direct circuit connected in series with each limit switch of the sensing means, or as complex as a computer which stores data relative to each piece of lumber sensed.

Located downstream from the sensing means is a second displacement means 32 which engages the lumber carried on the lines and displaces it laterally in a second direction, which is 180° opposed from the first direction, simultaneously with its movement along the lines.

In the embodiment illustrated the first and second displacement means comprise rollers 34 which are mounted rotatably between each of the lines in a manner such that their uppermost peripheral portions slightly extend above the top of the lines. Thus the lugs 13 continue to move the lumber along the lines as it simultaneously is displaced laterally by the rollers. The rollers are driven by drive means 36 in a manner such that the rollers of the first displacement means are rotated clockwise, looking from the infeed end of the system, and the rollers of the second displacement means are rotated counterclockwise. The roller drive means may be tied to the line drive means or may be separate as shown.

Located adjacent to the rollers of the second displacement means, on the second side of the apparatus, are lumber engagement means 38 for engaging the pieces of lumber preventing their further lateral displacement in the second direction. The number of lumber engagement means utilized depends on the number of lengths of lumber transported by the system. In the embodiment illustrated in FIG. 3, 5 lumber displacement means are used along with an outer edge stop 40 for sorting 6 lengths of lumber.

In the embodiment illustrated each lumber engagement means, shown in FIGS. 4 and 5, comprises an endless chain 42 pivotally carrying a plurality of segmented stops 44 about its periphery. The stops are pivotal between vertical engagement positions, for engaging the lumber being displaced by the second displacement means, and horizontal retracted positions, allowing passage of the lumber. The stops are mounted on bushings 43 carried between the links of the chain.

In the embodiment illustrated the stops are activated in sets of four, with each set configured to span the distance between adjacent lugs 13 on the lines for stopping a single piece of lumber. However, for different lug spacing the stops would be activated in other sets. As shown in FIGS. 4 and 5, the chain is mounted above the lines and is driven counterclockwise by chain 46. The chain 42 is driven at the same longitudinal rate that the chains of lines 12 are. Therefore, if the speed of lines 12 is variably controlled, chain 42 will follow it accordingly. In the embodiment illustrated the chain 42 is driven by the motor which drives the sorter 18. As illustrated, the stops engage the lumber when the stops are in the lower portion of their travel. If the difference in board lengths is small, requiring close mounting of alternate lumber engagement means, every other one may be reversed for locating below the lines to save space.

The chain is carried in C-shaped channels 48 separated by an I-beam 50. Covers 51 enclose the drive sprockets (not shown) at each end of the chain.

First positioning means, such as triangular knockdown plate 52, FIG. 8, is located at the upper right hand edge of channel 48 for knocking the stops to their horizontal positions as they initially pass over the upper portion of chain travel. Pad 54, formed from a low friction material, provides a bearing surface for the stops as they pass along the upper portion of the chain path.

The stops are positioned in their vertical positions by second positioning means, such as air cylinder 56, located at the left hand side of the lumber engagement means, and having a pusher 58 configured for moving the stops to their vertical positions when ram 60 is extended. Control means (not shown) activate the air cylinder between its extended and retracted position responsive to signals from the sensing means.

Located above the chain is snout 61, having a pointed leading edge which is positioned immediately to the left of the air cylinder (FIG. 7). The snout is contoured upwardly and inwardly driving a partially extended stop to its fully vertical position as the stop is moved past the snout by the chain. Thus a short, quick stroke of the air cylinder to initiate upward movement of the stop is all that is required to extend the stop, allowing the air cylinder to be retracted before the next stop travels into its path.

Extending from the trailing edge of the snout is an inner stop support 62 having low friction pads 64 and 66 located on one edge and on its radially inwardly facing side, respectively, for retaining the stops in their vertical and horizontal positions, respectively. The stop support is located around the periphery of the chain except at the area of the knockdown plate.

An outer stop support 68 having low friction pad 70 located on its radially outer surface extends around the periphery of the chain to stabilize the stops when they are in their vertical positions.

A lower stop support 72, having a low friction pad 74 located on one edge, is positioned below the lumber engagement means to support the outer portion of the stops when they are in their vertical positions preventing their deflection when they engage a piece of lumber.

OPERATION

Having thus described my invention in a preferred embodiment, its operation may be understood.

Lumber of various lengths placed on the infeed conveyor 14 is engaged by the lugs 13 of lines 12 and transported by the conveyor in a spaced manner toward the right, as viewed in FIGS. 1 and 3.

As the lumber enters the first displacement means 28, it is contacted by the rollers 34, which are rotated in the direction shown by the arrows, and is displaced in a first direction, or downwardly as shown in the drawing. The lumber is displaced as it continues to be transported along the lines until it contacts stop 30. The length of the rollers and their rotational speed are configured such that the shortest length of lumber can be displaced from one side of the lines to the other during the time it is engaged by the rollers.

The even ended lumber then is transported past the sensing means 16 where its length and other pertinent data are sensed. As noted above, the sensing means may vary in complexity depending on the requirements of the system. In any event it must be capable of transmitting a signal corresponding to the length of each piece of lumber that passes thereby to the lumber engagement means. The appropriate lumber engagement means then is activated for intercepting each sensed piece of lumber according to its length, centering it on the lines. Further, in the system shown, the signal also must be transmitted to the sorter for depositing each piece of lumber into the appropriate bin 76.

After the lumber passes the sensing means, it is transported by the lines to the second displacement means 32 where it is engaged by the rollers and displaced in the second direction, or upwardly as shown in the drawings, as it is transported simultaneously along the lines. The rollers of the second displacement means are of sufficient length and are rotated in the direction shown by the arrows at a rate which allows a piece of lumber of the shortest length to be displaced until it contacts edge stop 40 during the time it is engaged by the rollers.

However, every piece of lumber, except those of the longest length, will be stopped by one of the lumber engagement means according to its length, centering it upon the lines. Accordingly, the lumber engagement means are positioned transversely between the lines at locations which are offset from the centerline of the conveyor by a distance which is equal to one-half of the length of each length of lumber to be handled. In the embodiment illustrated five lumber displacement means are utilized for handling lumber of six different lengths, the longest length being stopped by the edge stop 40.

When a particular lumber engagement means receives a signal from the sensing means that a piece of lumber of a length associated with its location is approaching, air cylinder 56 sequentially is activated to position the appropriate set of four stops 44 in its vertical position for intercepting that piece of lumber as it is displaced on the second displacement means. Referring to FIGS. 4, 5 and 6, it will be noted that the air cylinder must only be extended a short distance in order to move each stop to a medial position 44a, as shown in FIG. 6. When in that position further travel of chain drive 46 causes the stop to be driven to its fully vertical position as it is moved along snout 16. Therefore the air cylinder is returned to its retracted position before the next stop arrives. Conversely, when a board is not intended to be intercepted by a particular lumber engagement means, the stops on that lumber engagement means, which are associated with that piece of lumber, will not be placed in their vertical positions, thereby allowing the piece of lumber to pass.

It will be noted that since the chain 42 is timed to move at the same linear rate of speed as lines 12, the stops move longitudinally along with the piece of lumber. Thus, once the appropriate stops are positioned vertically timing is not a problem. If the line is slowed down, the stops also are slowed down proportionately. Therefore, the stops are in position to engage the piece of lumber at all portions of its travel through the second displacement means. This allows operating the lines at a higher speed than would be possible if a fixed stop system was utilized.

It will be noted that once the stops are placed in their vertical positions, pads 64 and 70 on stop supports 62 and 68, respectively, maintain them in that position. In addition pad 74 on stop support 72 prevents the outer portion of the stops from being deflected when they engage the pieces of lumber.

As the stops are moved to the top of the chain path, after passing the lumber, they engage the knockdown plate 52, where all of them are knocked down to their horizontal positions. Thus only those stops repositioned by the air cylinder at the opposite end of the chain path will be located in their vertical positions on the following rotation.

After being positioned, the lumber then is transported on lines 12 to the sorter, the unscrambler and the stacker. Since the lumber is now centered, only two lines are required to transport the lumber, as opposed to many lines when in the uncentered orientation. Two lines will adequately transport centered pieces of lumber ranging from 8 feet to 24 feet in length. Thus the number of lines utilized in the sorter unloading system 78, the unscrambler, the stacker and other handling equipment is reduced greatly at a saving in initial cost and maintenance.

The system shown utilizes a bin type sorter wherein the lumber is carried by endless overhead chains 80 having J-bar carrier elements 82. The pieces of lumber may be displaced from the J-bars by appropriate means into the proper bins 76 for accumulation. In the embodiment illustrated the bins have vertically adjustable floors to gradually lower the lumber as the bin is filled.

The sorter also may be programmed along with the sensing means to sort the lumber other than by length. For example, it may be programmed to sort 8-foot, 10-foot, and 12-foot lumber, which is Grade A, into one bin. In this instance the centered lumber will stack uniformly in the bin. However, if desired, a certain class of lumber of a particular length could be offset by the positioning apparatus facilitating subsequent sorting or handling. In addition if a computer is included in the sensing means it may be programmed to position particular lengths of lumber such that they are centered over a selected group of lines. When lumber having an extremely wide range of lengths is handled, requiring the use of more than two lines, positioning in this manner will minimize the number of lines required.

The positioning apparatus of the present invention also may be used with cart-type, sling-type, or roller or chain tray sorting systems. In addition it may be used in conjunction with other lumber handling apparatus such as stackers. In any use only two lines are required to handle the lumber, thus lowering the cost of the system.

Having thus described my invention in preferred embodiment, I claim:

1. An apparatus for center positioning lumber and like elements being transported transversely on a conveyor having a plurality of carrier elements with spaced, raised lugs mounted thereon for engaging the lumber, prior to sorting or other similar handling, comprising:
   a. first displacement means interposing the carrier elements of the conveyor in a manner for engaging the lumber being carried on the conveyor,
   b. said first displacement means being configured for displacing the lumber being engaged thereby, laterally with respect to the conveyor in a first direction without interferring with its transportation on the conveyor,
   c. a mechanical stop located adjacent to the edge of the conveyor for engaging one end of the lumber being displaced by the first displacement means, even ending said lumber and preventing its further displacement in the first direction.

d. sensing means located across the conveyor downstream of the first displacement means for sensing the length of each piece of lumber relative to the mechanical stop after it has been even ended, e. second displacement means interposing the carrier elements of the conveyor downstream of the sensing means in a manner for engaging the lumber being carried on the conveyor, f. said second displacement means being configured for displacing the lumber located thereon laterally with respect to the conveyor in a second direction, 180° opposed to the first direction, without interference with its transportation on the conveyor, g. at least two lumber engagement means interimposing the carrier elements adjacent to the second displacement means, h. said lumber engagement means being positionable between engagement positions for engaging the pieces of lumber being displaced by the second displacement means, preventing their further displacement in the second direction, and retracted positions allowing the pieces of lumber to be displaced further by the second displacement means, and i. said lumber engagement means being positionable in their engagement positions responsive to a signal from the sensing means for engagement only with selected individual pieces of lumber while allowing other pieces of lumber to pass.

2. The apparatus of claim 1 wherein the first displacement means comprises rollers rotatably mounted with their longitudinal axes parallel to the conveyor, and their upper peripheral surfaces slightly extending above the plane of the conveyor but below the plane of the lugs, and roller drive means for driving said rollers in a direction causing the lumber engaged therewith to be displaced in the first direction.

3. The apparatus of claim 1 wherein the second displacement means comprises rollers rotatably mounted with their longitudinal axes parallel to the conveyor and their upper peripheral surfaces slightly extending above the plane of the conveyor but below the plane of the lugs, and roller drive means for driving said rollers in a direction causing lumber engaged therewith to be displaced in the second direction.

4. The apparatus of claim 1 wherein the lumber engagement means comprises:

a. a frame located between adjacent carrier elements of the conveyor, b. an endless chain rotatably carried on the frame defining a path therearound, c. a chain drive connected to the chain and configured for driving the chain about its path, d. a plurality of segmented stops pivotally attached to said chain, e. said stops being movable between vertical positions, wherein they intercept lumber being displaced on the second displacement means, and horizontal positions, wherein they allow passage of the lumber, f. first positioning means attached to the frame and configured for uniformly positioning the stops in their horizontal positions after the stops cross the path of the lumber, g. second positioning means attached to the frame and configured for positioning selected stops in their vertical positions before the stops cross the path of the lumber, and h. stop support means for maintaining the stops in their respective positions at all times except when they are adjacent to the first and second positioning means.

5. The apparatus of claim 4 wherein the first positioning means comprising a wedge-shaped knockdown pad located on the frame and mounted in a manner for engaging the stops which are positioned in their vertical positions for knocking them down to their horizontal positions as they are moved past the knockdown pad by the chain.

6. The apparatus of claim 4 wherein the second positioning means comprising:

a. an air cylinder movable between an extended position for moving a stop engaged thereby from its horizontal position partially to its vertical position, and a retracted position out of engagement with a stop positioned in its horizontal position, b. control means supplying pressurized air to the air cylinder for extending it to its extended position responsive to a signal from the sensing means, and c. a snout mounted on the frame adjacent to the path of the chain and configured for engaging a stop positioned particlally in a vertical position for moving said stop to its fully vertical position as the stop is moved past the snout by the chain.

7. The apparatus of claim 7 wherein the stops have a width which is approximately one-quarter of the lug spacing on the conveyor elements.

8. The apparatus of claim 1 wherein the outermost lumber displacement means comprises a fixed stop located outwardly adjacent to the conveyor.

* * * * *

UNITED STATES PATENT AND TRADEMARK OFFICE
CERTIFICATE OF CORRECTION

PATENT NO. : 4,069,910
DATED : January 24, 1978
INVENTOR(S) : Arnold F. Faley

It is certified that error appears in the above-identified patent and that said Letters Patent are hereby corrected as shown below:

Col. 1, Line 9     Change "end" to --ends--.

Col. 3, Line 59    After the word "chain" add the word --drive--.

Col. 5, Line 44    Change "16" to --61--.

Col. 6, Line 68    Change "direction." to --direction,--.

Col. 8, Line 32    Change "comprising:" to --comprises:--.

Col. 8, Line 46    Change "of claim 7" to --of claim 4--.

Signed and Sealed this

Twenty-first Day of November 1978

[SEAL]

Attest:

RUTH C. MASON
Attesting Officer

DONALD W. BANNER
Commissioner of Patents and Trademarks